US012393519B2

(12) United States Patent
Ojogbo et al.

(10) Patent No.: US 12,393,519 B2
(45) Date of Patent: Aug. 19, 2025

(54) SYSTEMS AND METHODS FOR DYNAMICALLY ALLOCATING MEMORY PAGES TO ENABLE MEMORY FOOTPRINT REDUCTION

(71) Applicant: QUALCOMM Incorporated, San Diego, CA (US)

(72) Inventors: Ejebagom Ojogbo, San Diego, CA (US); Andrew Edmund Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/408,311

(22) Filed: Jan. 9, 2024

(65) Prior Publication Data

US 2025/0225078 A1 Jul. 10, 2025

(51) Int. Cl.
*G06F 12/1009* (2016.01)

(52) U.S. Cl.
CPC ................................ *G06F 12/1009* (2013.01)

(58) Field of Classification Search
CPC .................................................. G06F 12/1009
See application file for complete search history.

(56) References Cited

U.S. PATENT DOCUMENTS

| 6,990,535 B1* | 1/2006 | Yang | G06F 13/4243 |
| | | | 709/236 |
| 2010/0316114 A1* | 12/2010 | Fallon | H03M 7/30 |
| | | | 375/240 |
| 2018/0190236 A1* | 7/2018 | Philipp | G09G 5/005 |
| 2022/0222012 A1* | 7/2022 | Matturi | G06F 3/0659 |
| 2025/0028463 A1* | 1/2025 | Nukata | G06F 3/0631 |
| 2025/0036424 A1* | 1/2025 | Toh | G06F 12/1054 |

* cited by examiner

*Primary Examiner* — Sean D Rossiter
(74) *Attorney, Agent, or Firm* — Muncy, Geissler, Olds & Lowe, P.C.

(57) ABSTRACT

A method and apparatus for reducing a memory footprint of compressed data by dynamically allocating and recycling memory pages. The method may include allocating a dedicated subset of the memory pages to a private page pool separate from a main memory such that the dedicated subset of the memory pages is allocatable separately from the main memory, receiving compressed data, allocating at least one physical address of the dedicated subset of the memory pages from the private page pool for the compressed data, and writing the compressed data to the one or more physical addresses.

20 Claims, 9 Drawing Sheets

SYSTEMS AND METHODS FOR DYNAMICALLY ALLOCATING MEMORY PAGES TO ENABLE MEMORY FOOTPRINT REDUCTION

BACKGROUND

The storage size of sensor data gathered by modern computing devices is increasingly large. As a result, sensor data can quickly overload memory or greedily use entire blocks of memory of a computing device. For example, capturing high resolution photos and videos by a smartphone requires allocating large buffers in main memory to immediately retain the photos/videos. In between the capture of sensor data and storage of that data, the captured data sensor may be compressed. However, because the compression ratio for a particular data capture is not known when memory is allocated, memory space within memory buffers may be unused and cannot be re-allocated to new incoming data. Consequently, the space saving benefits of compressing captured sensor data via bandwidth compression methods may be lost when the data is stored in the buffer.

SUMMARY

Various aspects include a system and method for dynamically allocating memory pages to enable footprint compression, including: allocating a dedicated subset of the memory pages to a private page pool separate from a main memory such that the dedicated subset of the memory pages is allocatable separately from the main memory, receiving compressed data, allocating one or more physical addresses of the dedicated subset of the memory pages from the private page pool for the compressed data, and writing the compressed data to the one or more physical addresses.

In some aspects, allocating the predefined number of memory pages may include determining a compression ratio, determining an expected throughput based on the compression ratio, and allocating the one or more physical addresses of the dedicated subset of the memory pages from the private page pool based on the expected throughput. Some aspects may further include determining that one or more allocated physical addresses allocated from the private page pool for the compressed data remain unused for writing the compressed data, transferring the one or more allocated physical addresses to the private page pool, and allocating one or more previously allocated physical addresses from the private page pool for a write operation. In this manner the system may reallocate unused physical addresses that have been allocated but not written to.

Some aspects may further include determining a usage rate of the dedicated subset of the memory pages in the private page pool, determining whether a number of remaining pages in the private page pool is below a threshold based on the usage rate, requesting additional memory pages from the main memory in response to determining whether the number of remaining pages in the private page pool is below the threshold, and adding the additional memory pages to the private page pool. Some aspects may include determining whether the number of remaining unallocated pages in the private page pool is above a second threshold based on the usage rate, and returning one or more pages from the private page pool to operating system main memory in response to determining that the number of remaining unallocated pages in the private page pool is above the second threshold. Some aspects may include receiving the compressed data from an application specific integrated circuit, and transferring the compressed data out of the dedicated subset of the memory pages of the private page pool to the main memory after writing the compressed data.

In some aspects, writing the compressed data to the one or more physical addresses may include mapping a virtual address to each of the one or more physical addresses, and may further include storing the mapping of virtual addresses and physical addresses that have been allocated in a private page table separate from a page table indexing the main memory. In some aspects, allocating the one or more physical addresses of the dedicated subset of the memory pages may further include accessing the one or more physical addresses via a private address cache for the private page pool, where the one or more physical addresses are assigned in a single memory clock cycle.

Further aspects include a computing device including a memory and a processor and/or memory device configured to perform operations of any of the methods summarized above. Further aspects include a non-transitory processor-readable storage medium having stored thereon processor-executable software instructions configured to cause a processor and/or memory frequency device to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
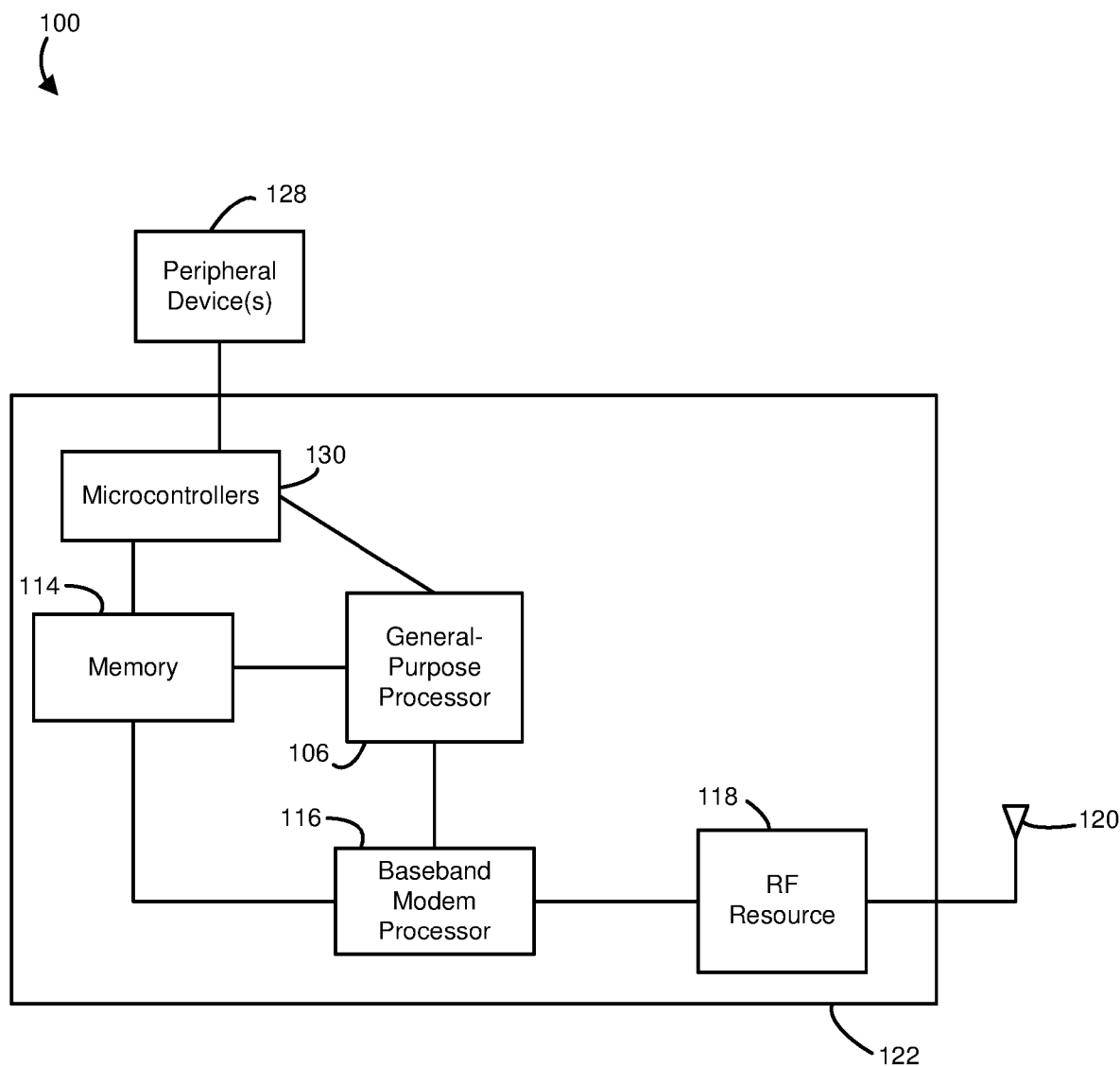
FIG. 1 is a functional block diagram of an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods and apparatus implementing such methods for dynamically allocating memory pages to enable reducing the memory footprint when using bandwidth compression on incoming data, such as sensor data. In various embodiments, a processor of a computing device may allocate a dedicated subset of the memory pages to a private page pool separate from a main memory such that the dedicated subset of the memory pages is allocatable separately from the main memory, receive compressed data, allocate one or more physical addresses of the dedicated subset of the memory pages from the private page pool for the compressed data, and write the compressed data to the one or more physical addresses. Various embodiments advantageously recycle unused pages of memory that otherwise would be allocated but not needed.

In some embodiments the allocation of the predefined number of memory pages may include determining a compression ratio, determining an expected throughput based on the compression ratio, and allocating the one or more physical addresses of the dedicated subset of the memory pages from the private page pool based on the expected throughput. That is, because page allocation is dynamic and easily increased (low cycle overhead), the initial allocation of pages can also be more efficient and target the expected compression ratio.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

The term "system on chip" or the abbreviation "SOC" are used herein interchangeably to refer to a set of interconnected electronic circuits typically, but not exclusively, including a processor, a memory, and a communication interface. A processor may include a variety of different types of processors 14 and processor cores, such as a general purpose processor, a central processing unit (CPU), a digital signal processor (DSP), a graphics processing unit (GPU or GFX), an accelerated processing unit (APU), a secure processing unit (SPU), a network processor, neural network processing unit (NPU), double data rate (DDR) memory, a subsystem processor of specific components of the computing device, such as an image processor for a camera subsystem or a display processor for a display, an auxiliary processor, a single-core processor, a multicore processor, a controller, a microcontroller, and the like. A processor may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon. One or more of these processors may be understood to be a processor system.

In hardware that is designed to capture volumes of data, such as cameras, backscatter machines, inertial measurement units, and other sensor hardware, the bandwidth associated with the received sensor data requires that the data must be stored quickly as it is collected. Often this quick storage may involve greedily allocating the maximum amount of memory pages from main memory that could be needed for each incoming block of data. In other words, the bandwidth buffer must quickly absorb the data that is collected in the line buffers of the capturing device or sensor (e.g., a camera).

For example, capturing high resolution photos and videos may require allocating huge buffers in main memory. However, good bandwidth compression before storage may result in a lot of space within those buffers that is unused but locked up due to the allocation. Reducing the memory allocation to match the expected bandwidth after compression may free up memory for use by other applications. However, under-allocation of memory can result in data loss due to the high number of cycles required to request and allocate new pages from main memory when more data is being captured and needs to be stored. Further, the compression ratio (CR) of the data may be difficult to predict until the buffer has been completely written and compressed. Buffers may be allocated at the start of execution and unused pages remain allocated within the buffer until they are freed by the application, which takes too long.

The method and apparatus of various embodiments addresses these issues by dynamically allocating memory pages based on demand and post-compression. Further, unused pages from the stored buffers can be easily (with low cycle overhead) freed and re-allocated. To accomplish these functions and reduce memory waste in bandwidth compressed buffers, the method and apparatus of various embodiments may use a private page pool that manages a set of physical memory address allocated to the private pool by main memory. This may enable quickly allocating, re-allocating, and freeing up memory pages in the page pool. That is, the private page pool may allow for allocation of memory pages (or adding more memory pages) for storage of compressed data within 10 cycles or a single cycle.

By utilizing a private page pool with its own local page tables, memory may be assigned and freed within the page pool without making requests and waiting for responses from the translation lookaside buffer (TLB) or other main memory management processes (e.g., multiple page tables/directories). This enables footprint compression for bandwidth compressed buffers that saves space in main memory (e.g., DDR). Further, this method and apparatus reduces address translation overhead for buffers due to the separate page allocation process provided herein. The method and apparatus also place control of the data storage processes closer to the hardware capturing the data which may reduce bus traffic.

In some embodiments the private page pool may be a dedicated subset of physical memory stored as physical memory addresses that may be indexed by a private state table. Allocating a predefined number of memory pages for an initial storage process may include allocating the predefined number of memory pages from the private page pool. Thus, physical memory pages may be de-allocated from the main memory page directories and may instead be allocated for management by the method and apparatus described herein.

Various embodiments include a method and apparatus to determine a usage rate of memory pages in the private page pool, determine whether a number of remaining pages in the page pool is below a first threshold based on the usage rate, request additional memory pages from a main memory in response to determining whether the number of remaining pages in the page pool is below the first threshold, and add the additional memory pages to the private page pool. In other words, the page pool may be regularly checked to ensure that it can handle the expected number of pages needed over a following period of time, where the following period may be the expected time needed to receive further pages from main memory. In some embodiments the processor may determine whether the number of remaining unallocated pages in the page pool is above a second threshold based on the usage rate, and return one or more pages from the private page pool to the operating system (OS) main memory (e.g., evicting one or more free pages in the page pool cache back out to the main memory) in response to determining that the number of remaining unallocated pages in the private page pool is above the second threshold.

FIG. 1 is a functional block diagram of an example computing device 100 suitable for implementing various embodiments. With reference to FIG. 1, the computing device 100 may be a smart phone, a tablet, a personal computer, or other electronic device. The computing device 100 may include a radio frequency (RF) resource 118, an antenna 120, and a baseband-modem processor 116 for external communication including wireless communication. The computing device 100 may include microcontrollers 130 that connect to peripheral device(s) 128. The peripheral devices 128 may include sensors, imaging machinery, data input sockets (e.g., gigabit ethernet) and other data inputs or hardware. The microcontrollers 130 may be configured to receive, compress, and otherwise process the received data from the peripheral devices. Microcontrollers 130 may connect to main memory 114 and general purpose processor 106 for further storage and processing support.

In some embodiments, the general-purpose processor 106, memory 114, baseband-modem processor 116, and RF resource 118 may be included in a SOC device 122. Further, various input and output devices may be coupled to components of the system-on-chip device 122, such as interfaces or controllers. Example user input components suitable for use in the computing device 100 may include, but are not limited to, a keypad, a touchscreen, such as a beveled edge touchscreen.

The computing device 100 may include at least one controller (e.g., microcontroller 130) that includes a coder/decoder (CODEC). The CODEC may operate as an inline compression engine for compression of data using one or more compression processes, where the compression process may correspond to the data or peripheral device 128 connected to the microcontroller 130. The general-purpose processor (e.g., CPU) 106 may also be connected to at least one memory 114. The memory 114 may be a non-transitory tangible processor-readable storage medium that stores processor-executable instructions (e.g., Double Data Rate Synchronous Dynamic Random-Access Memory-DDR SDRAM). The memory 114 may include a secure memory portion and an unsecure memory portion.

The processor-executable instructions may include further processing instructions for data received from peripheral devices 128 after that data has been stored in memory 114. The memory 114 may store the OS as well as user application software and executable instructions. The general-purpose processor 106 and memory 114 may each be connected to at least one baseband-modem processor 116. The user application software and executable instructions executing on the general purpose processor 106 may compete with each other and compete with microcontrollers 130 for access to memory 114 (e.g., memory page look ups and page allocation).

The microcontrollers 130 of a computing device 100 may be configured to execute software or firmware including at least one compression engine that may be associated with at least one peripheral device 128. Microcontrollers 130 may be configured to support a variety of peripheral devices 128 that fulfill different user requirements in order to expedite data offloading from the peripheral devices 130 and ensure the efficient storage of that offloaded data into memory 114. Memory 114 may be addressed or accessed by microcontrollers 130 via virtual addresses that are translated by a memory controller of memory 114 or via physical addresses that may not require translation and may correspond to block in memory 114.

The RF resource 118 may include receiver and transmitter circuitry coupled to at least one antenna 120 and configured to perform transmit/receive functions for the wireless services associated with the computing device 100. The RF resource 118 may implement separate transmit and receive functionalities or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage-controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth and/or the like).

Figure 2:
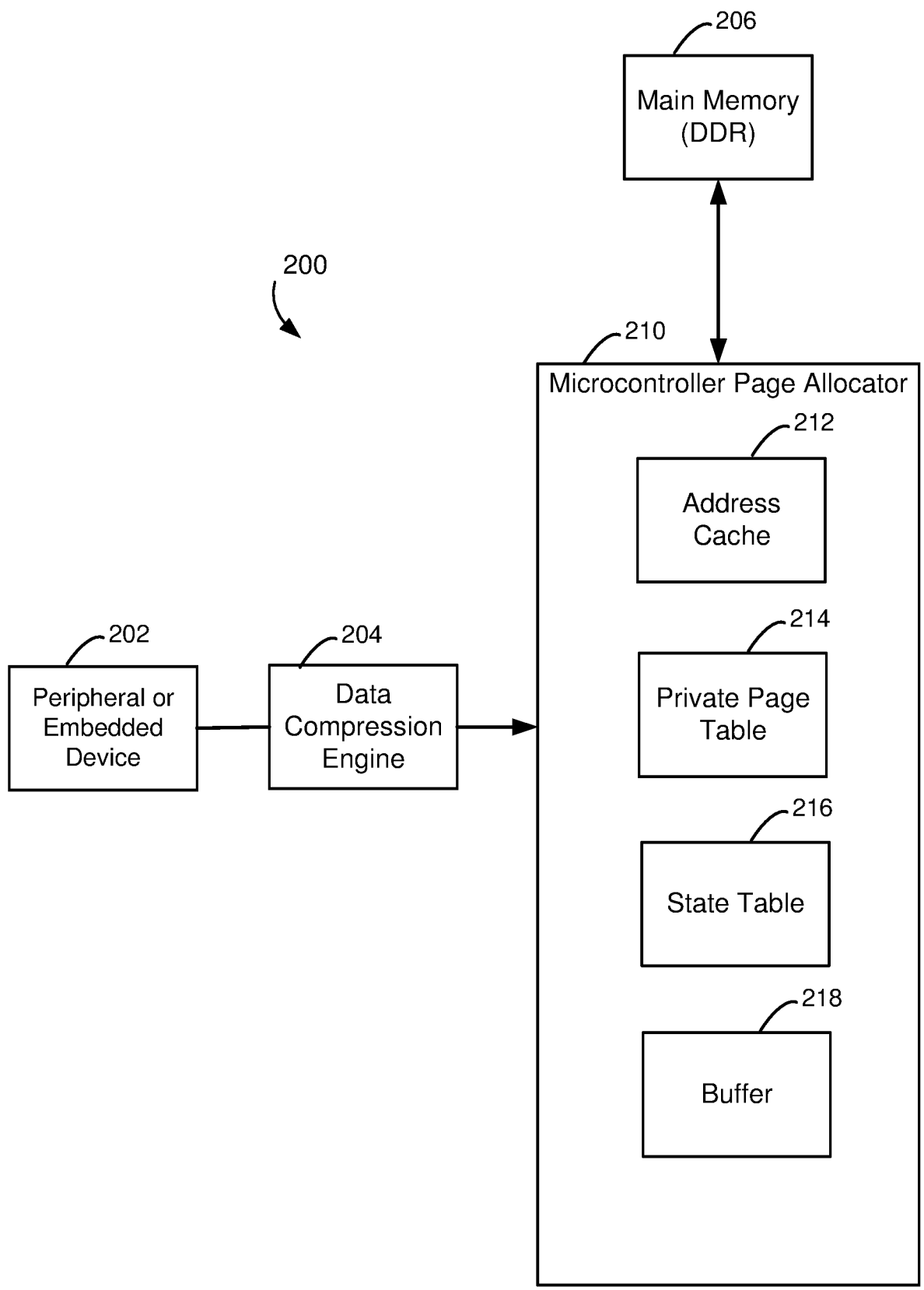
FIG. 2 is a component block diagram illustrating an example system for dynamically allocating memory pages according to some embodiments.

FIG. 2 illustrates an example of components of a computing device 200 and signaling between the components for dynamic allocation of memory for storage of data that is offloaded from peripheral or embedded device 202. With reference to FIGS. 1-2, a microcontroller page allocator 210 (e.g., one of microcontrollers 130) may connect to data compression engine 204 which may connect to peripheral or embedded device 202. The peripheral or embedded device 202 (e.g., camera sensor) may capture data and transmit that data to data compression engine 204 which may compress and forward the data to microcontroller page allocator 210. The microcontroller page allocator 210 may connect to main memory (DDR) 206 and may forward data there and address physical and/or virtual memory blocks in main memory 206. The integrated circuit logic that makes up the microcontroller page allocator 210 may be embodied as a separate entity (as depicted), embodied as part of the peripheral device hardware, or embodied in a memory controller or SOC.

The microcontroller page allocator 210 may be embodied in hardware (i.e., integrated circuits), firmware, software, or a combination thereof and may operate as a data bridge between line buffers of a peripheral or embedded device 202 and main memory 206. The microcontroller page allocator 210 (MPA) may include subcomponents including an address cache 212, a private page table 214, a state table 216, and one or more buffers 218. Many of the subcomponents of the MPA 210 form a separate, private memory allocation mechanism that operates in parallel with the main memory allocation processes. For example, main memory 206 may include a corresponding address cache (e.g., on general purpose processor 106), one or more page tables/directories, a state table, and one or more buffers (e.g., translation look aside buffer-TLB).

The separate private memory allocation of MPA 210 may request, at start up, an initial block of a certain number of memory pages from the operating system running on general purpose processor 106 based on expected usage rate from the peripheral or embedded device 202 and the predicted compression ratio (CR) of the data compression engine 204. These initial memory pages that are predicted to satisfy the particular usage rate of the MPA 210 may be deallocated from main memory and the initial memory pages together form a private page pool for use by the MPA 210. The MPA 210 may store the physical memory addresses of the pages in the private page pool so as to enable direct addressing of the physical pages which are a part of main memory.

The memory pages dedicated to the private page pool may be internally addressed and requested using private virtual addresses in private page tables that are local to the MPA 210. To assist with this internal addressing and to manage the page pool, the MPA 210 may include its own address cache 212 that stores recently used or recently requested/queued memory addresses for quicker indexing and access by the MPA 210 when writing or reading to those memory blocks. The MPA 210 may include its own private page table 214 that records mappings or translations between private (local) virtual addresses and physical addresses of main memory allocated to the private page pool. The private (local) virtual addresses may follow a different addressing or indexing scheme (e.g., directory less) than the main memory 206. The MPA 210 may include its own state table 216 that records the usage state of every memory page or memory address managed by the MPA 210 and the private page pool. The MPA 210 may include its own buffers 218 for accepting data received from peripherals before the data can be written out to pages in main memory 206 within the private page pool.

For example, when data is received at MPA 210 from the peripherals, the data may be temporarily stored in a buffer 218. The data may then be written to a virtual address retrieved from the address cache 212. The virtual address may be translated using the private page table 214 and may result in a state update in the state table 216 indicating the memory address or page as allocated or unallocated. The data received from the peripherals may be written out to physical memory in one memory cycle (e.g., clock cycle). Thus, incoming data may be written to memory without competing with other memory requests from other hardware and software on the computing device (e.g., 100, 122).

Figure 3:
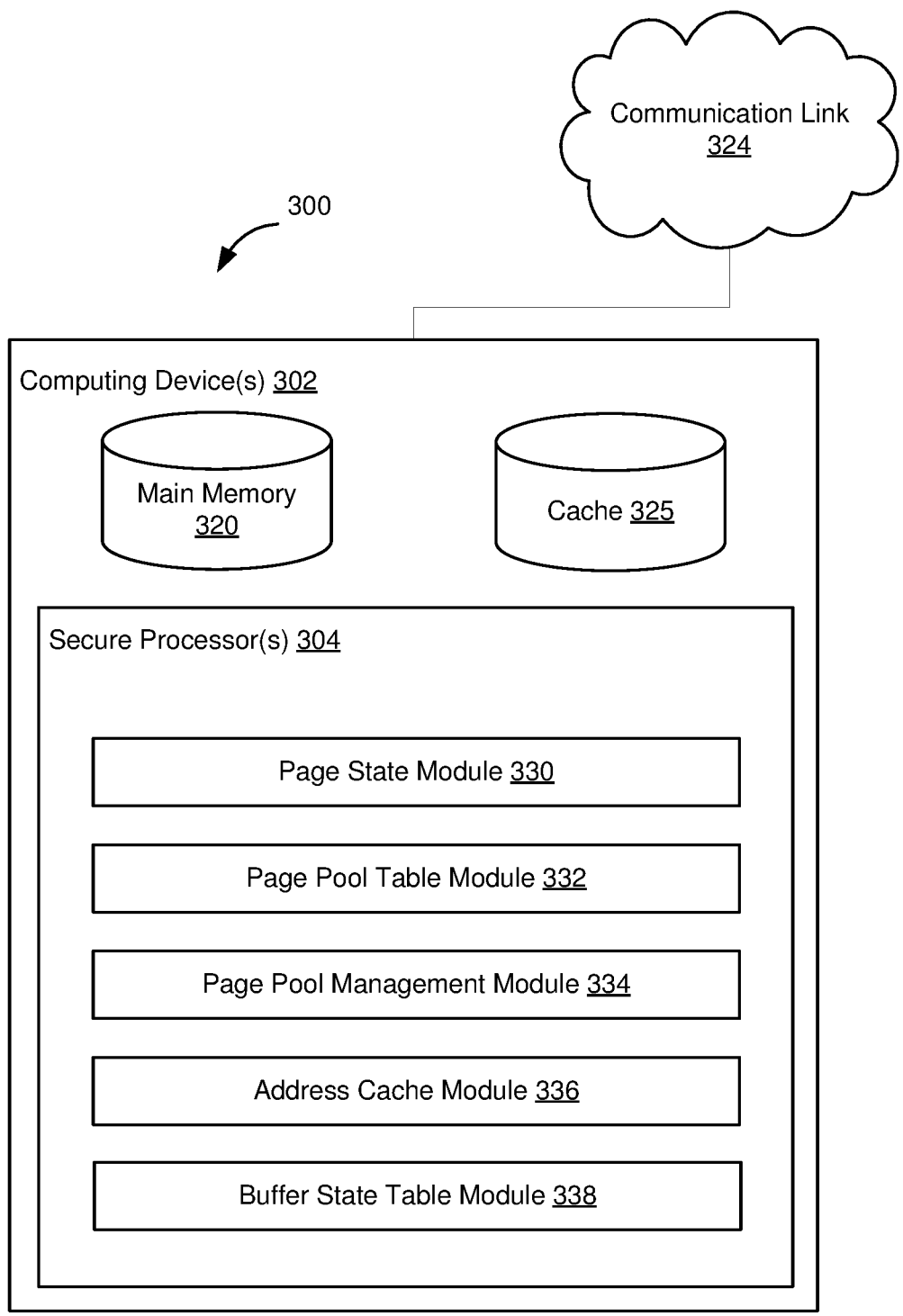
FIG. 3 is a component block diagram illustrating an example system for dynamically allocating memory pages according to some embodiments.

FIG. 3 is a component block diagram illustrating various functional blocks of a microprocessor according to some embodiments. With reference to FIGS. 1-3, the system 300 illustrated in FIG. 3 includes a computing device 302 which may include a secure processor 304, main memory 320, and cache 325. The computing device 302 may connect to external devices via communication link 324 (e.g., wireless link, ethernet link). The computing device 302 may include main memory 320 that is addressable by the computing device 302 and the secure processor 304 (e.g., microcontroller 130). The computing device 302 may include a memory controller for main memory 320 that controls requests for memory resources.

The secure processor(s) 304 may include a page state module 330, a page pool table module 332, a page pool management module 334, an address cache module 336, and buffer state table module 338. The cache 325 may be allocated to or a part of a processor of the computing device 302 (e.g., general purpose processor 106) or secure processor 304, or shared cache on a SOC device 122 including a general processor and secure processor 304. The cache 325 may be used for temporary storage of mappings, addresses, and data being read/written by the modules 330-338.

The page state module 330 may record (with a bit flag or other indicator) the state of each page allocated to the page pool of the secure processor 304. The state of the page may be set to indicate that the page is unused (empty) or free, allocated, assigned, used (actively storing data). Accordingly, the page state module 330 may include a state table covering all the memory pages assigned to the private page pool. The page state module 330 may include a state table that covers a subset of the memory pages managed by the system. The subset may be substantially the same as those pages stored in a cache or may be a different subset (since a cache hit may bypass the state table). The page state module 330 may include a state table covering the memory pages assigned to the private page table. A state table allows the secure processor 304 to determine whether or not a particular virtual page has been mapped to a physical address, streamlining decisions on whether to request new mappings. Other modules (e.g., 332-338) may check on page status in order to determine what actions to take with respect to an incoming request related to a page/address.

The page pool table module 332 may manage a private page table of memory pages that have been mapped or allocated in the secure processor 304. The private page table may be stored in main memory 320 and may hold all current virtual-physical page mappings of the system. The private page table may be separate from the page mapping architecture of main memory 320 and may provide virtual addresses for a separate subset of physical addresses of main memory 320. The management of the private table may include adding and removing entries to the table in response to actions by the page pool management module 334. The page pool table module 332 may perform virtual-physical address translation for the secure processor 304 so that the secure processor can access memory without going out to page tables that map main memory (e.g., 206).

Further, a private table that is distinct from the private page table may be managed by the page pool table module 332. This private table may contain a list of physical pages from the page pool that have been given to the allocator. As memory pages are assigned to virtual addresses the memory pages may be removed from this list, and as memory pages are freed, the memory pages are placed back into this list.

The page pool management module 334 may operate to ensure that the appropriate number of memory pages are available or free for use in the page pool. This determination may be based on the usage rate of the connected peripherals (e.g., 202), the compression rate of the data compression engine 204, or other memory usage metrics, or a combination thereof. The page pool management module 334 may request from main memory 320 that additional pages to be assigned to the private page pool or the page pool management module 334 may release unused memory pages back to main memory if they are not expected to be used. These processes are described in more detail regarding FIG. 6. The page pool management module 334 may also manage a page pool cache that stores unused pages as a first in first out circular buffer so that empty pages can be accessed and assigned within one memory cycle.

The address cache module 336 may operate to store the recently used address mappings of memory pages so that they can be quickly accessed by read or write operations of the secure processor 304. For example, if a memory page to be written to is in the address cache, then the secure processor 304 may be able to assign the memory page for a write operation within one memory cycle. The address data of the address cache may be physically stored in main memory 320 or in cache 325 (e.g., a cache of the secure processor 304) and may be managed by the address cache module 336. For example, the management of the address cache module 336 may include determining which memory addresses are likely to be requested next. For a case where data is being continuously written from the peripheral device into the page pool memory pages, the address cache may be configured to store the virtual address mappings of the allocated pages to be used next by the expected incoming data. For a case where capture from the peripheral has paused, the address cache may be configured to store the addresses of the most recent reads/write (e.g., so a user can easily review what was just captured). The address cache may be managed as a first in first out (FIFO) circular buffer for page assignment.

The buffer state table module 338 may operate to manage initial storage of data from the peripherals and compression engine (e.g., 202, 204) and to split up the capture into blocks of memory pages. For a capture process, the buffer state table module 338 may determine whether an incoming address from a read/write instruction is greater or less than a greatest allocated index (e.g., of a page pool table or page pool cache). The buffer state table module 338 may create and organize virtual buffers for storage of data by the secure processor 304 (e.g., MPA 210). This determination may inform the secure processor 304 as to where to look next for mapping information for the received address of the read/write instruction.

The main memory 320 may include non-transitory storage media that electronically stores information. The main memory 320 may include one or both of system storage that is provided integrally (i.e., substantially non-removable) within the processors 130 or 122 (e.g., within the same SOC or SIP) and/or removable storage that is removably connectable to the processor(s) 106/122 via, for example, a port (e.g., a universal serial bus (USB) port, a firewire port, etc.) or a drive (e.g., a disk drive, etc.). In various embodiments, main memory 320 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media 320. The electronic storage 320 may store software algorithms, information determined by processor(s) 304, and/or other information that enables the processor(s) 130/122 to function as described herein.

The computing device 302 may include the secure processor 304 (e.g., microcontroller 130) or secure portion of a processor that may be configured by machine-readable instructions to perform operations of various embodiments. Machine-readable instructions may include one or more instruction modules encoded in firmware or hardware circuits. The instruction modules may include computer program modules.

The description of the functionality provided by the different modules 330-338 is for illustrative purposes, and is not intended to be limiting, as any of modules 330-338 may provide more or less functionality than is described. For example, one or more of modules 330-338 may be eliminated, and some or all of its functionality may be provided by other ones of modules 330-338. As another example, secure processor 304 may execute one or more additional modules that may perform some or all of the functionality attributed below to one of modules 330-338. One or more modules 330-338 may form a dynamic private page allocator for high-speed data received by the computing device 302.

Figure 4:
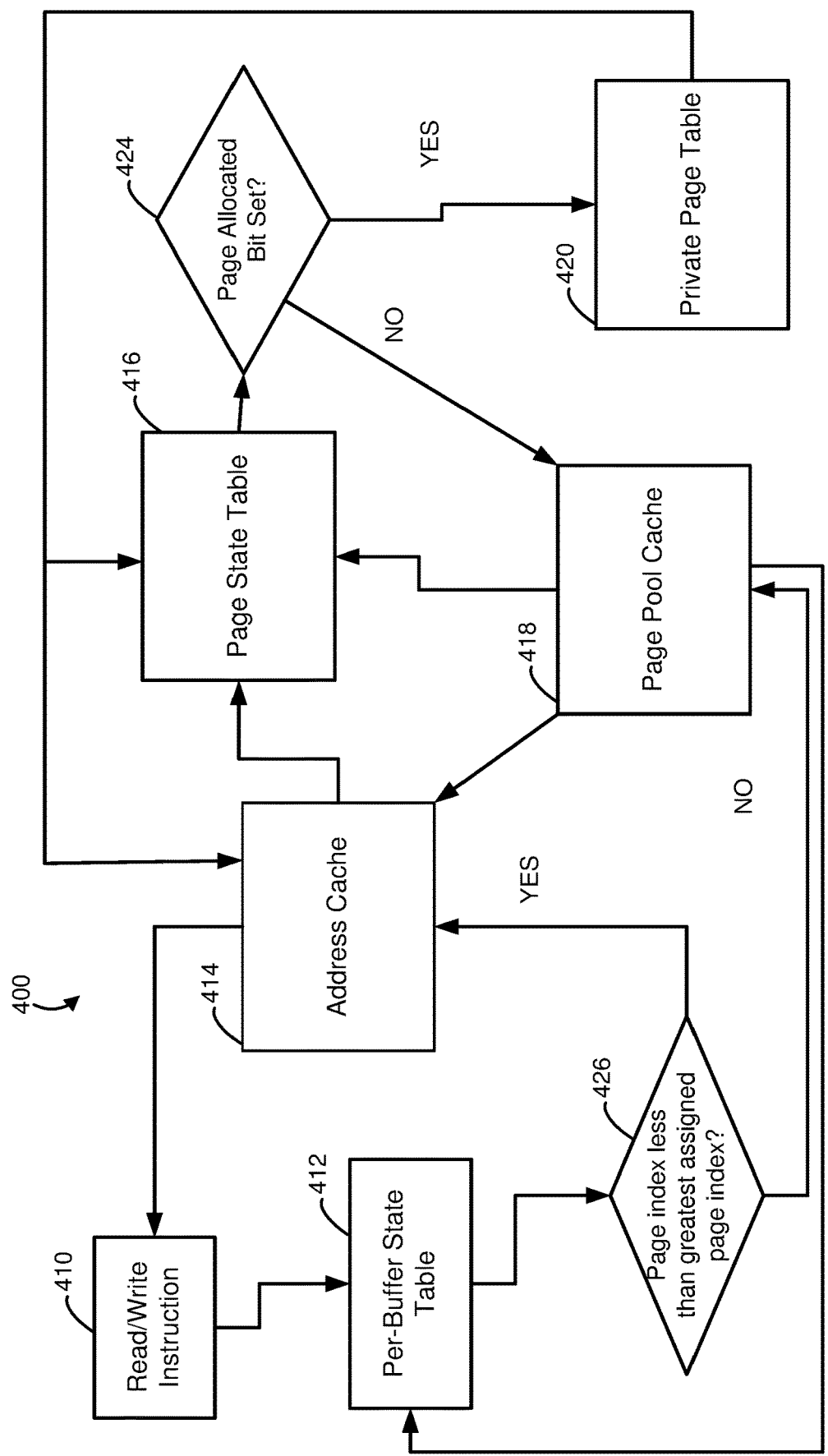
FIG. 4 is a process flow diagram illustrating operations involved in dynamically allocating memory pages according to some embodiments.

FIG. 4 is a data flow diagram illustrating an example method 400 for dynamically allocating memory pages. With reference to FIGS. 1-4, operations of the method 400 may be performed by a processor of a computing device according to various embodiments. In some embodiments, means for performing operations of the method 400 may be a processor (e.g., 122, 130, 106, 210) of the computing device (e.g., 100), and/or the like, or a processor system of one or more of such processors.

The processor of the computing device may receive a read or write instruction 410 with data to be written to the computing device. The data may be received from a peripheral device (e.g., 202, 204, 128), which may transmit the instruction. The received data and instruction 410 may be evaluated based on a per buffer state table 412. A single buffer may include multiple memory pages for storage with a buffer state table 412 for recording the use state of the multiple memory pages. A single image may be allocated a single buffer for that image. For a video, the processor may allocate a buffer for each frame of the video. For every buffer (e.g., 218) managed by the computing device the state of the addresses in the buffer may need to be evaluated as to whether they have been written to or not. The state determination may be whether the address is allocated or unallocated and the determination may be based on a greatest assigned page index stored in the per-buffer state table 412.

In determination block 426, as part of the determination about the state of the memory address of the read/write instruction 410, the computing device may compare a page index of the memory address with the greatest assigned page index to determine if the memory address has been allocated or not. The greatest assigned page index may be a counter that records the greatest index of virtual address that has been assigned. If the page index is less than or equal to the greatest assigned index (i.e., determination block 426=YES), the processor may pass the memory address on to the address cache 414 for mapping. If the page index is greater than or equal to the greatest assigned index (i.e., determination block 426=NO), the processor may pass the memory address on to the page pool cache 418 for mapping. In some embodiments, the virtual address may be looked up in the address cache 414 and the per-buffer state table in parallel to reduce latency.

If the determination block 426 result is that the page index is less than or equal to the greatest assigned index (i.e., determination block 426=YES), then the read/write instruction 410 may be sent on to the address cache 414 to be processed using a virtual address in cache (if present-a "hit"). The read/write instruction 410 may then be executed based on the virtual-physical address in cache, and the processor may receive/perform another read/write instruction 410. If the virtual address is not mapped in address cache 414 (not present-a "miss"), which may be the case where memory access is not sequential (e.g., random or striped), the processor or address cache 414 may pass the virtual address and read/write instruction 410 on to the page state table 416 to determine its allocation state or further information.

If the processor determines that the page index is greater than the greatest assigned index (i.e., determination block 426=NO), then the processor may determine that the virtual address for the page has not been assigned and may pass the read/write instruction 410 on to the page pool cache 418 for processing. The processor may allocate a new (next) virtual address and executing the read/write instruction at the virtual address (e.g., storing data at the address). After allocating the virtual address, the processor may update the state of the address in the per-buffer state table 412 and update the greatest assigned page index. Likewise, the processor may update the address cache 414, the page state table 416, and private page table 420 to indicate the virtual address is allocated and to store the virtual-physical mapping in the address cache. If the page index is greater than the greatest assigned index, then the page pool cache 418 may be triggered immediately to pop a physical address from cache for assignment to the virtual address as it is unmapped/unallocated.

As described above, if the virtual address that is passed to the address cache 414 for mapping to a physical address is not in the address cache 414, then the state of the memory page at the virtual address may be passed to the page state table 416 for a state look up. The page state table 416 may be a table with a bit flag for each virtual address or page that indicates whether that virtual address or page has been allocated a physical address (allocated storage space). The page state table 416 may be implemented as a cache covering a subset of memory pages (e.g., a subset of the private page table 420) such that a miss in the page state table 416 may trigger a lookup in the private page table 420.

In determination block 424, the computing device, using the page state table 416, may look up the bit flag corresponding to the page to determine whether the page allocate bit is set (i.e., 1). If the determination block 424 determines that the page allocation bit is not set (i.e., determination block 424=NO), then the computing device may pass the virtual address on to the page pool cache 418 so that a physical address may be allocated via a page pool look up for the next free memory page. Likewise, once allocation is complete, the page state table 416, address cache 414, and greatest page index/per-buffer state table 412 may be updated with the allocation state and address mapping, as the case may be.

). If the determination block 424 determines that the page allocation bit is set (i.e., determination block 424=YES), then the computing device may fetch the physical address corresponding to the virtual address from the private page table 420. That is, if the page allocation bit is set, then the computing device has assigned a physical address, but the mapping may not be present in the address cache 414 or page pool cache 418. The address cache 414 and page pool cache 418 may be checked first for this mapping as such accesses may require fewer memory cycles (e.g., less than 5, or less than 1).

Upon fetching the physical address from the private page table 420, the computing device may transmit the address and status to the address cache 414 and the page state table 416 to update them. The physical address that has been fetched from the private page table 420 may also be used to execute the read/write instruction 410. The processing of that read/write instruction 410 may be completed and another instruction may then be processed. Together, the per-buffer state table 412, the address cache 414, the page state table 416, the page pool cache 418, and the private page table 420 as private, dedicated reference structures in memory allow the identification or assignment of a physical address for memory being written to the computing device to be completed in one memory cycle.

This process and the corresponding data structures of FIG. 4 may be implemented with sequential memory coding, striped memory coding, random memory coding, or other memory codings. The costliest operation may be accessing the private page table which may be advantageously avoided for most write operations by providing physical addresses to be used in the page pool cache 418. For page access with sequential or stride-based access patterns, almost all write requests would be greater than the greatest allocated page index. For page access with random access patterns, the read/write instructions may more commonly have unallocated pages less than the greatest allocated page index. In this case, the page state table 416 may reduce the instances where the computing device needs to go to the private page pool 420 only to confirm the virtual address is unallocated. The page state table 416 may confirm whether or not a page has been allocated without consulting the private page pool 420, reducing the translation overhead for unallocated pages in random access memory patterns to 3 lookups. In some embodiments that implement sequential memory access patterns, the page state table 216 may be optional. In general, the lines illustrating flow of addresses in FIG. 4 may illustrate operations (e.g., lookups/updates) that may be performed within one memory clock cycle (with the exception of fetches/updates involving the private page table 420).

Figure 5:
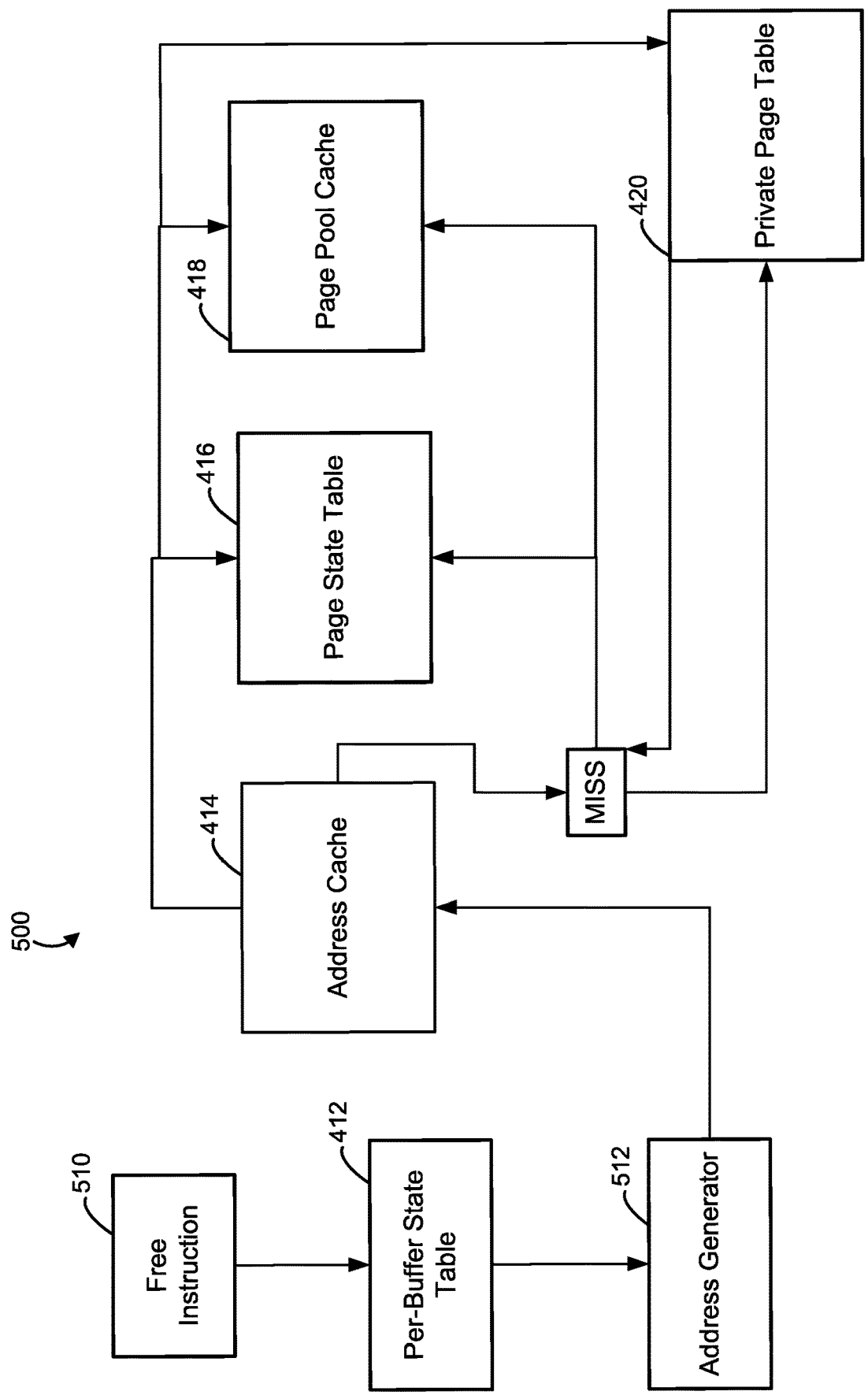
FIG. 5 is a process flow diagram illustrating operations involved in freeing memory pages within the private pool according to some embodiments.

FIG. 5 is a data flow diagram illustrating an example method 500 for freeing pages that are no longer needed. With reference to FIGS. 1-5, operations of the method 500 may be performed by a processor of a computing device according to various embodiments. In some embodiments, means for performing operations of the method 500 may be a processor (e.g., 122, 130, 106, 210) of the computing device (e.g., 100), and/or the like, or a processor system of one or more of such processors.

The computing device (e.g., microcontroller 130) processing the data flow of method 500 may receive a free instruction 510 that instructs the computing device to free some of the pages that have been allocated for its private use. For example, a user may delete recently captured images stored in pages managed by the computing device. The computing device or an outside device may then determine that those pages should be freed and issue free instruction 510. The free instruction 510 and the method 500 is directed to freeing the private pages of the computing device and returning them to the private page pool of the computing device. The free instruction 510 may or may not include the virtual addresses of the pages to be freed.

The free instruction 510 may first look up the greatest allocated page index and a last written page index in the per-buffer state table 412. The series of one or more addresses that may be between these two indices may be processed by address generator 512 to create a list of virtual addresses that may be freed. Any other indices may be used to similarly create a list of virtual addresses to be freed. These virtual addresses may each be looked up in the address cache 414. If the virtual address to be freed that is looked up is in the address cache 414 (i.e., is present-hit), then the virtual to physical mapping in the address cache 414 may be used to invalidate (clear) that cache entry and invalidate (clear) the corresponding entries in the page state table 416 and the private page table 420. Likewise, the physical address for the freed page may be sent back to the page pool cache 418 for reuse.

If the virtual address to be freed that is looked up is not in the address cache 414 (i.e., not present-miss), then the virtual to physical mapping in the address cache 414 may fetch the physical address for the freed page and then invalidate the mapping in the page state table 416 and the private page table 420. Likewise, the physical address for the freed page may be sent back to the page pool cache 418 for reuse. Accordingly, pages that have not been written to or which hold data that has been deleted may be returned to the private page pool (e.g., page pool cache).

In addition, this process of freeing a page that was recently allocated and returning it to the page pool may be accomplished in less than 5 memory cycles if the address is in the address cache 414. This process in method 500 may be performed to free memory addresses that have been allocated to but not written to such that only the memory addresses being used to store date are secured from other use. For example, if a storage process fetches 10 memory pages for a buffer and allocates the 10 memory pages to physical addresses to store an image, when the image is successfully compressed with a higher compression ratio than expected (e.g., see process of FIG. 2), then only 8 memory pages may be needed and written to. The free page operations of method 500 enables the physical addresses of the two unused (unwritten to) memory pages to be freed and returned to the page pool. This freeing of unused allocated physical addresses in a quick manner (e.g., less than 5 memory cycles) enables footprint compression. Footprint compression processes may then identify these unused addresses by analyzing memory operations and may issue free instructions (e.g., 510) to compress the memory footprint used by data being offloaded from a peripheral device-see FIG. 2.

Figure 6:
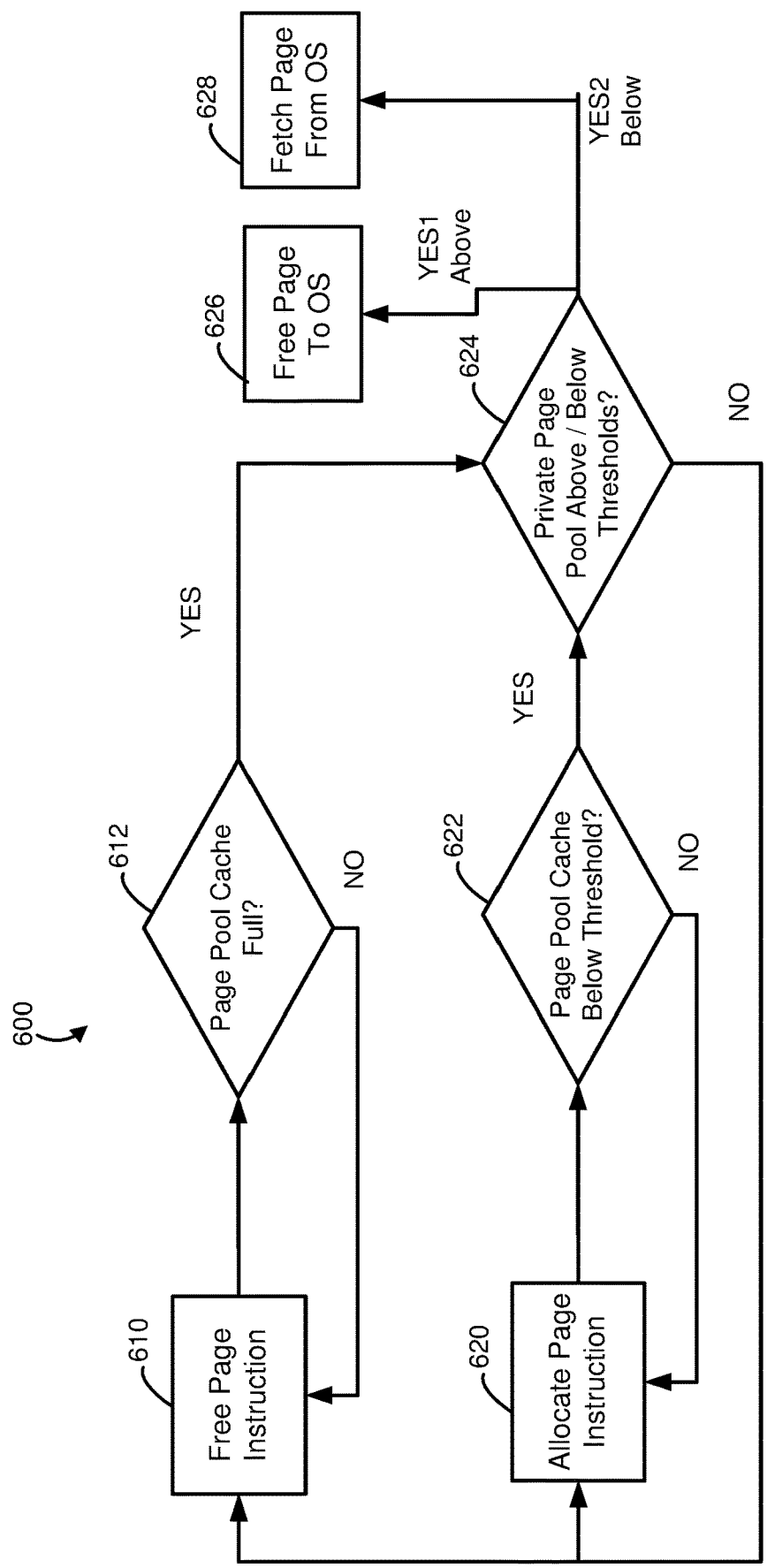
FIG. 6 is a process flow diagram illustrating operations involved in maintaining an adequate private page pool for dynamic allocations according to some embodiments.

FIG. 6 is a process flow diagram illustrating an example method 600 for releasing/requesting pages from main memory. With reference to FIGS. 1-6, operations of the method 600 may be performed by a processor of a computing device according to various embodiments. In some embodiments, means for performing operations of the method 600 may be a processor (e.g., 122, 130, 106, 210) of the computing device (e.g., 100), and/or the like, or a processor system of one or more of such processors.

As described regarding FIG. 3 and the page pool management module 334, the volume of free, allocatable pages in the private page pool is maintained so that no memory access or write by the computing device (e.g., microcontroller 130) will require a request to main memory and the page tables and directories thereof. To properly manage the volume of addresses in the private page pool and to avoid amassing all memory pages of main memory in the private page pool, the computing device may periodically determine that some pages should be released or that some pages should be requested.

By monitoring the number of requests or releases per 100 cycles, which may be the page pool table fetch latency, a computing device processor may determine that not all of the free pages in the page pool cache may be needed. The computing device processor may then issue a free page instruction 610 (e.g., a push operation) which may initiate a check at determination block 612 if the page pool cache is full (i.e., full of freed physical memory addresses). The request/release rate may be updated upon every release from the cache.

If the determination of determination block 612 is that the cache is not full (i.e., determination block 612=NO), the processor may wait another 100 cycles and check again. If the determination of determination block 612 is that the cache is full (i.e., determination block 612=YES), the processor may evict one or more free pages in the page pool cache back out to the private page table and may continue to determination block 624.

By monitoring the number of requests per 100 cycles, which may be the page pool table fetch latency, the processor may determine that more free pages may be needed in the page pool cache. For example, after a page is allocated from the page pool cache (allocate page instruction 620), the processor may check in determination block 622 whether the page pool cache is below a first threshold (based on usage characteristics) number of available physical memory addresses (i.e., unallocated pages). The request rate may be updated upon every request from the cache. The request rate checked after instruction 620 may be different from the request/release rate checked after instruction 610.

If the processor determines that the cache is not below the first threshold (i.e., determination block 622=NO), the processor may wait another 100 cycles and check again. If the processor determines that the cache is below the first threshold number of available physical memory addresses (i.e., unallocated pages) (i.e., determination block 622=YES), the processor may request or fetch additional free or unallocated physical addresses from the private page pool or private page pool table so as to refill the private page pool cache and avoid being penalized as would happen if the page pool cache ran out of physical addresses to allocate. The fetch of addresses from the private page pool resulting from the determination that the cache is below a threshold (i.e., determination block 622=YES), may also cause the processor to perform the operations in determination block 624.

Whether the operation in determination block 624 is reached following a release of freed pages to the private page pool table or is reached following a fetch of free pages from the private page pool table, in determination block 624 the processor may check whether the private page pool and the unallocated pages of the private page pool table are above or below a high (referred to as a second threshold) and low threshold, respectively, based on usage and recent fetched/released pages from the page pool cache.

If the processor determines that the number of remaining unallocated pages is above the second high threshold (the high threshold being greater than the low threshold) (i.e., determination block 624=YES1), then in block 626 the processor may release pages that have been allocated to the private page pool and to the computing device and may release those pages to the OS main memory. Thereafter, the released pages may be managed by the OS memory management and page tables.

If the processor determines that the number of unallocated pages is below a low threshold (the high threshold being greater than the low threshold) (i.e., determination block 624=YES2), the processor may request additional memory pages from the OS to be allocated to the private page pool for management by the computing device rather than the OS in block 628. In this case, the processor may determine (e.g., 624) that the local page pool is running out of space for storage and may request more pages from the OS. If the processor determines that the number of unallocated pages is not below a low threshold and not above a high threshold (the high threshold being greater than the low threshold) (i.e., determination block 624=NO), the processor may return to checking the state of the cache upon page allocations/freeing. Accordingly, the high and low thresholds for the unallocated pages of the private page pool may define a safe operating zone for the dynamic page allocator based on memory usages (e.g., peripherals) and incoming data rates (e.g., compression ratio).

Figure 7:
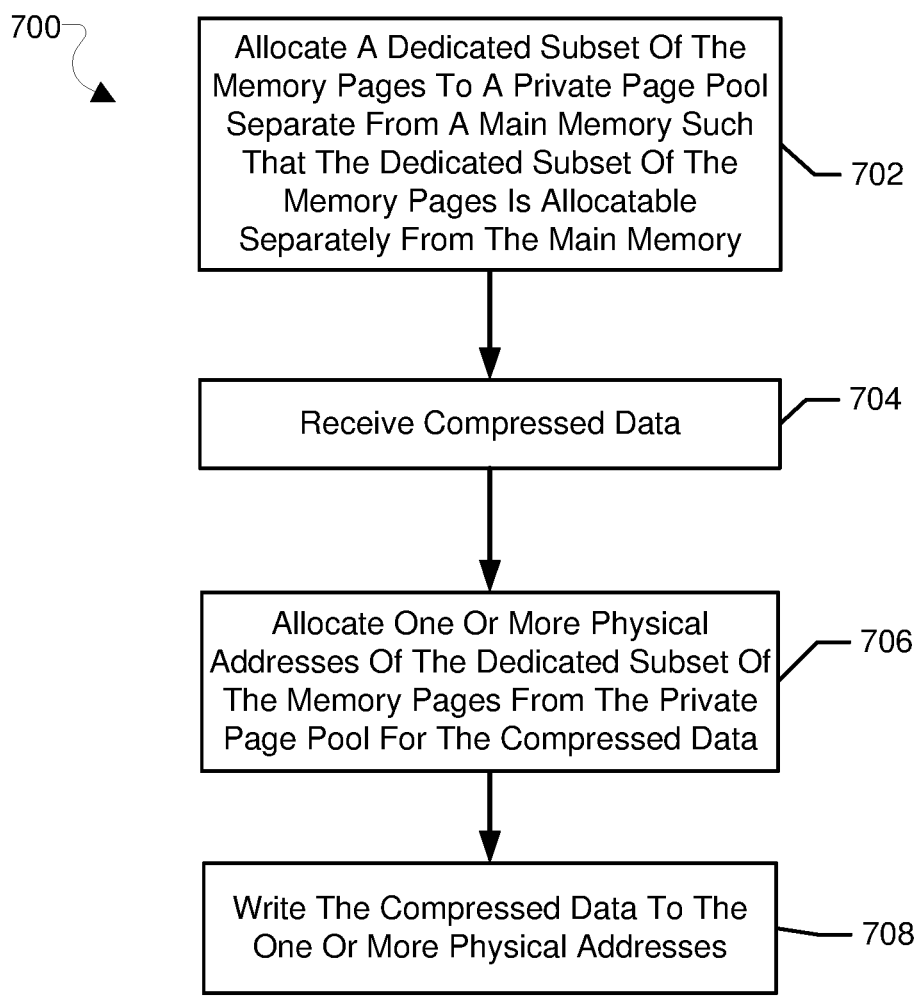
FIG. 7 is a process flow diagram illustrating a method 700 for dynamically allocating memory pages according to some embodiments.

FIG. 7 is a process flow diagram illustrating an example method 700 for dynamically allocating memory pages according to various embodiments. With reference to FIGS. 1-7, the operations of the method 700 may be performed by at least one processor within a processing system of a computing device, in hardware, or in a combination of a software-configured processor and dedicated hardware. In order to encompass the alternative configurations enabled in various embodiments, the hardware implementing the method 700 is referred to herein as a "processor." Further, means for performing functions of the method 700 may be a processor (e.g., 122, 130, 106, 210) of the computing device (e.g., 100), and/or the like, or a processor system of one or more of such processors.

Figure 8:
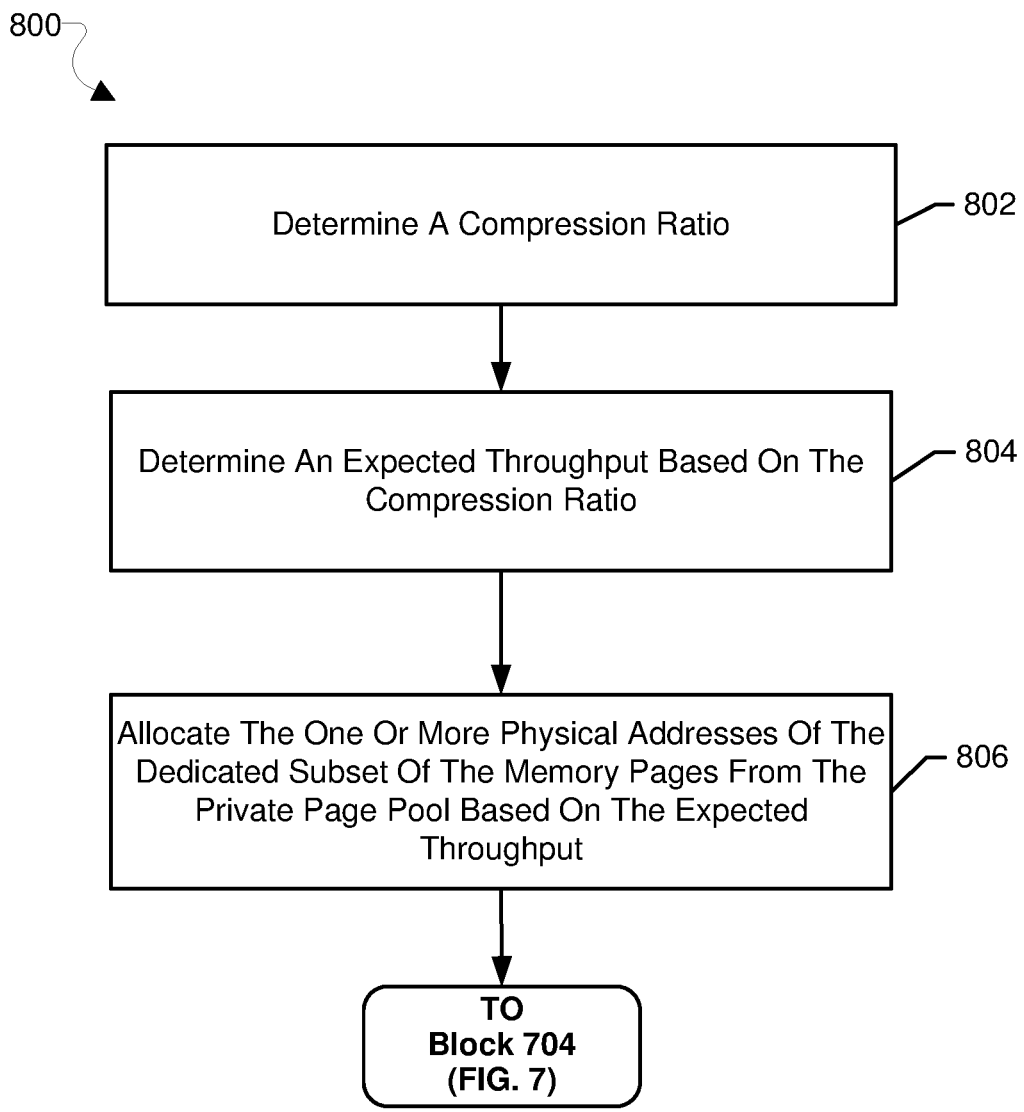
FIG. 8 is a process flow diagram illustrating a method 800 for dynamically allocating memory pages according to some embodiments.

In block 702, the processor may allocate a dedicated subset of the memory pages to a private page pool separate from a main memory such that the dedicated subset of the memory pages is allocatable separately from the main memory. FIG. 8 illustrates this process of allocating in further detail. The page pool may be a dedicated subset of physical memory addresses indexed for rapid use and allocating the predefined number of memory pages for the storage process may include allocating the predefined number of memory pages from the page pool. Further, the processor may determine that one or more allocated physical addresses allocated from the private page pool for the compressed data remain unused for writing the compressed data, transfer the one or more allocated physical addresses to the private page pool, and allocate one or more previously allocated physical addresses from the private page pool for a write operation.

In block 704, the processor may receive compressed data. The compressed data may be received to be stored through the storage process that has been allocated memory pages. Further, the compressed data may be received from an application specific integrated circuit and the processor may transfer the compressed data out of the dedicated subset of the memory pages of the private page pool to the main memory after writing the compressed data. The processor may determine a usage rate of the dedicated subset of the memory pages in the private page pool, determine whether a number of remaining pages in the private page pool is below a threshold based on the usage rate, request additional memory pages from the main memory in response to determining whether the number of remaining pages in the private page pool is below the threshold, and add the additional memory pages to the private page pool.

In block 706, the processor may allocate one or more physical addresses of the dedicated subset of the memory pages from the private page pool for the compressed data. In some cases, not all of the allocated memory pages may be used by the compressed data and so maybe allocated for the storage but not written to. The processor may allocate one or more physical addresses of the dedicated subset of the memory pages by accessing the one or more physical addresses via a private address cache for the private page pool, where the one or more physical addresses are assigned in a single memory clock cycle.

In block 708, the processor may write the compressed data to the one or more physical addresses. In some cases, the remaining, unused memory pages that had been allocated are now transferred and recycled back to a page pool. In some cases, not all of the allocated memory pages may be used by the compressed data and so maybe allocated for storage but not written to. The processor may write the compressed data to the one or more physical addresses by mapping a virtual address to each physical address, and the processor may store the mapping of virtual addresses and physical addresses that have been allocated in a private page table separate from a page table indexing the main memory.

FIG. 8 is a process flow diagram illustrating an example method 800 for dynamically allocating memory pages. With reference to FIGS. 1-8, operations of the method 800 may be performed by at least one processor within a processing system of a computing device, in hardware, or in a combination of a software-configured processor and dedicated hardware. In order to encompass the alternative configurations enabled in various embodiments, the hardware implementing the method 800 is referred to herein as a "processor." Further, means for performing functions of the method 800 may be a processor (e.g., 122, 130, 106, 210) of the computing device (e.g., 100), and/or the like, or a processor system of one or more of such processors.

In block 802, the processor may determine a compression ratio for incoming data that is to be part of the storage process. The compression ratio may be targeted or may be based on recent/prior compression ratios and may be calculated by a compression engine disposed inline between a peripheral device capturing data and the computing device.

In block 804, the processor may determine an expected throughput based on the compression ratio. The expected throughput may be understood to be the expected bandwidth or data rate which must be stored as part of the storage operation (e.g., block 702). The expected throughput may vary depending on the peripheral device and one or more capture settings of the peripheral device (e.g., video mode or picture mode).

In block 806, the processor may allocate a predefined number of memory pages based on the expected throughput. After this initial allocation (e.g., 702) which may allocate one or more physical memory addresses for the storage processes, the process 800 may continue to block 704 of FIG. 7. If the initial allocation based on expected throughput is not sufficient, the computing device may allocate more memory pages, which may require only one memory clock cycle.

Figure 9:
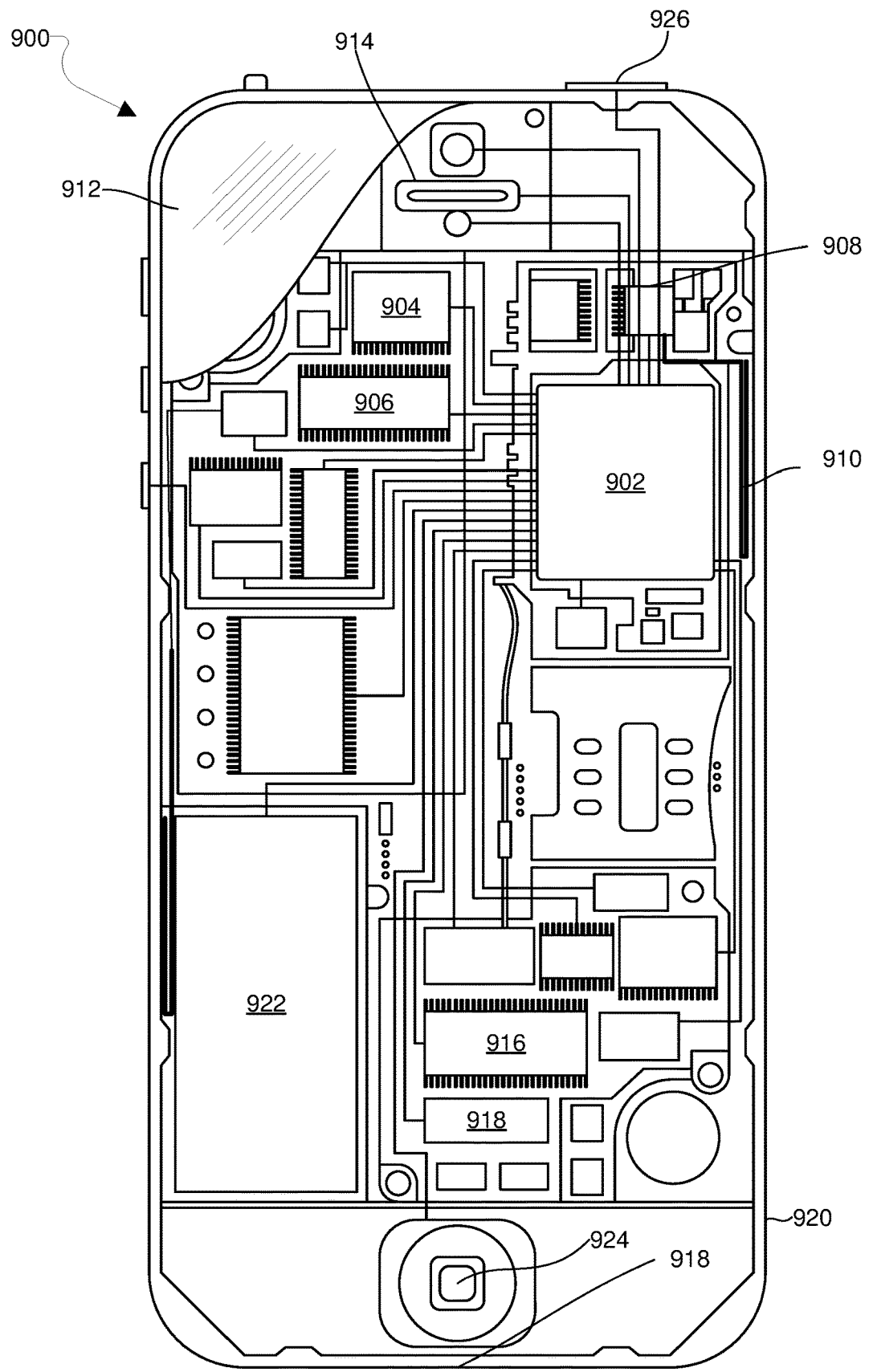
FIG. 9 is a component block diagram illustrating an example computing device suitable for implementing various embodiments.

Various embodiments (including, but not limited to, embodiments described above with reference to FIGS. 1-8) may be implemented in mobile computing devices, an example of which suitable for use with the various embodiments is illustrated in FIG. 9 as a user equipment (UE) 900. The UE 900 may include a processor 902 coupled to a touchscreen controller 904 and an internal memory 906. The processor 902 may be one or more multicore integrated circuits designated for general or specific processing tasks. The internal memory 906 may be volatile or non-volatile memory and may also be secure and/or encrypted memory, or unsecure and/or unencrypted memory, or any combination thereof. Examples of memory types that can be leveraged (and dynamically allocated) include but are not limited to DDR, LPDDR, GDDR, WIDEIO, RAM, SRAM, DRAM, P-RAM, R-RAM, M-RAM, STT-RAM, embedded DRAM, non-volatile flash memory, UFS, SDCC, etc. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the UE 900 need not have touch screen capability.

The UE 900 may have one or more radio signal transceivers 908 (e.g., Peanut, Bluetooth, ZigBee, Wi-Fi, RF radio) and antennae 910, for sending and receiving communications, coupled to each other and/or to the processor 802. The transceivers 908 and antennae 910 may be used with the above-mentioned circuitry to implement the various wireless transmission protocol stacks and interfaces. The UE 900 may include a cellular network wireless modem chip 916 that enables communication via a cellular network and is coupled to the processor 902.

The UE 900 may include a peripheral device connection interface 918 coupled to the processor 902. The peripheral device connection interface 918 may be singularly configured to accept one type of connection or may be configured to accept various types of physical and communication connections, common or proprietary, such as Universal Serial Bus (USB), FireWire, Thunderbolt, or PCIe. The peripheral device connection interface 918 may also be coupled to a similarly configured peripheral device connection port (not shown).

The UE 900 may also include speakers 914 for providing audio outputs. The UE 900 may also include a housing 920, constructed of a plastic, metal, or a combination of materials, for containing all or some of the components described herein. The UE 900 may include a power source 922 coupled to the processor 902, such as a disposable or rechargeable battery. The rechargeable battery may also be coupled to the peripheral device connection port to receive a charging current from a source external to the UE 900. The UE 900 may also include a physical button 924 for receiving user inputs. The UE 900 may also include a power button 926 for turning the UE 900 on and off.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations disclosed herein may be substituted for or combined with one or more operations of the methods and operations disclosed herein.

Implementation examples are described in the following paragraphs. While some of the following implementation examples are described in terms of example methods, further example implementations may include: the example methods discussed in the following paragraphs implemented by a UE including a processor (e.g., a modem processor) configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processor of a UE (e.g., a modem processor) to perform the operations of the methods of the following implementation examples.

Example 1. A method for dynamically allocating memory pages, including: allocating a dedicated subset of the memory pages to a private page pool separate from a main memory such that the dedicated subset of the memory pages is allocatable separately from the main memory; receiving compressed data; allocating one or more physical addresses of the dedicated subset of the memory pages from the private page pool for the compressed data; and writing the compressed data to the one or more physical addresses.

Example 2. The method of example 1, in which allocating the one or more physical addresses of the dedicated subset of the memory pages includes: determining a compression ratio; determining an expected throughput based on the compression ratio; and allocating the one or more physical addresses of the dedicated subset of the memory pages from the private page pool based on the expected throughput.

Example 3. The method of any of examples 1-2, further including: determining that one or more allocated physical addresses allocated from the private page pool for the compressed data remain unused for writing the compressed data; transferring the one or more allocated physical addresses to the private page pool; and allocating one or more previously allocated physical addresses from the private page pool for a write operation.

Example 4. The method of any of examples 1-3, further including: determining a usage rate of the dedicated subset of the memory pages in the private page pool; determining whether a number of remaining unallocated pages in the private page pool is below a first threshold based on the usage rate; requesting additional memory pages from the main memory in response to determining that the number of remaining unallocated pages in the private page pool is below the first threshold; and adding the additional memory pages to the private page pool.

Example 5. The method of example 4, further including determining whether the number of remaining unallocated pages in the private page pool is above a second threshold based on the usage rate; and returning one or more pages from the private page pool to main memory in response to determining that the number of remaining unallocated pages in the private page pool is above the second threshold.

Example 6. The method of any of examples 1-5, further including: receiving the compressed data from an application specific integrated circuit; and transferring the compressed data out of the dedicated subset of the memory pages of the private page pool to the main memory after writing the compressed data.

Example 7. The method of any of examples 1-6, in which writing the compressed data to the one or more physical addresses includes mapping a virtual address to each of the one or more physical addresses, the method further including: storing the mapping of virtual addresses and physical addresses that have been allocated in a private page table separate from a page table indexing the main memory.

Example 8. The method of any of examples 1-7, in which allocating one or more physical addresses of the dedicated subset of the memory pages includes: accessing the one or more physical addresses via a private address cache for the private page pool, in which the one or more physical addresses are assigned in a single memory clock cycle.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, processor-executable software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method for dynamically allocating memory pages, comprising:
   allocating a dedicated subset of the memory pages to a private page pool separate from a main memory such that the dedicated subset of the memory pages is allocatable separately from the main memory;
   receiving compressed data;
   allocating one or more physical addresses of the dedicated subset of the memory pages from the private page pool for the compressed data, wherein allocating the one or more physical addresses of the dedicated subset of the memory pages comprises:
      determining a compression ratio;
      determining an expected throughput based on the compression ratio; and
      allocating the one or more physical addresses of the dedicated subset of the memory pages from the private page pool based on the expected throughput; and
   writing the compressed data to the one or more physical addresses.

2. The method of claim 1, further comprising:
   determining that one or more allocated physical addresses allocated from the private page pool for the compressed data remain unused for writing the compressed data;
   transferring the one or more allocated physical addresses to the private page pool; and
   allocating one or more previously allocated physical addresses from the private page pool for a write operation.

3. The method of claim 1, further comprising:
   determining a usage rate of the dedicated subset of the memory pages in the private page pool;
   determining whether a number of remaining unallocated pages in the private page pool is below a first threshold based on the usage rate;
   requesting additional memory pages from the main memory in response to determining that the number of remaining unallocated pages in the private page pool is below the first threshold; and
   adding the additional memory pages to the private page pool.

4. The method of claim 3, further comprising:
   determining whether the number of remaining unallocated pages in the private page pool is above a second threshold based on the usage rate; and
   returning one or more pages from the private page pool to main memory in response to determining that the number of remaining unallocated pages in the private page pool is above the second threshold.

5. The method of claim 1, further comprising:
   receiving the compressed data from an application specific integrated circuit; and
   transferring the compressed data out of the dedicated subset of the memory pages of the private page pool to the main memory after writing the compressed data.

6. The method of claim 1, wherein writing the compressed data to the one or more physical addresses includes mapping a virtual address to each of the one or more physical addresses, the method further comprising:

storing the mapping of virtual addresses and physical addresses that have been allocated in a private page table separate from a page table indexing the main memory.

7. The method of claim 1, wherein allocating one or more physical addresses of the dedicated subset of the memory pages comprises:
accessing the one or more physical addresses via a private address cache for the private page pool,
wherein the one or more physical addresses are assigned in a single memory clock cycle.

8. An apparatus, comprising:
a main memory;
a processor connected to the main memory and configured to:
allocate a dedicated subset of the memory pages to a private page pool separate from the main memory such that the dedicated subset of the memory pages is allocatable separately from the main memory;
receiving compressed data;
allocate one or more physical addresses of the dedicated subset of the memory pages from the private page pool for the compressed data, wherein to allocate the one or more physical addresses of the dedicated subset of the memory pages, the processor is further configured to:
determine a compression ratio;
determine an expected throughput based on the compression ratio; and
allocate the one or more physical addresses of the dedicated subset of the memory pages from the private page pool based on the expected throughput; and
write the compressed data to the one or more physical addresses.

9. The apparatus of claim 8, wherein the processor is further configured to:
determine that one or more allocated physical addresses allocated from the private page pool for the compressed data remain unused for writing the compressed data;
transfer the one or more allocated physical addresses to the private page pool; and
allocate one or more previously allocated physical addresses from the private page pool for a write operation.

10. The apparatus of claim 8, wherein the processor is further configured to:
determine a usage rate of the dedicated subset of the memory pages in the private page pool;
determine whether a number of remaining unallocated pages in the private page pool is below a first threshold based on the usage rate;
request additional memory pages from the main memory in response to determining that the number of remaining unallocated pages in the private page pool is below the first threshold; and
add the additional memory pages to the private page pool.

11. The apparatus of claim 10, wherein the processor is further configured to:
determine whether the number of remaining unallocated pages in the private page pool is above a second threshold based on the usage rate; and
return one or more pages from the private page pool to main memory in response to determining that the number of remaining unallocated pages in the private page pool is above the second threshold.

12. The apparatus of claim 8, wherein the processor is further configured to:
receive the compressed data from an application specific integrated circuit; and
transfer the compressed data out of the dedicated subset of the memory pages of the private page pool to the main memory after writing the compressed data.

13. The apparatus of claim 8, wherein the processor is further configured to:
write the compressed data to the one or more physical addresses by mapping a virtual address to each of the one or more physical addresses, and
store the mapping of virtual addresses and physical addresses that have been allocated in a private page table separate from a page table indexing the main memory.

14. The apparatus of claim 8, wherein the processor is configured to allocate at least one physical address of the dedicated subset of the memory pages by accessing the one or more physical addresses via a private address cache for the private page pool, wherein the one or more physical addresses are assigned in a single memory clock cycle.

15. An apparatus, comprising:
means for allocating a dedicated subset of memory pages to a private page pool separate from a main memory such that the dedicated subset of the memory pages is allocatable separately from the main memory;
means for receiving compressed data;
means for allocating at least one physical address of the dedicated subset of the memory pages from the private page pool for the compressed data, wherein means for allocating the one or more physical addresses of the dedicated subset of the memory pages comprises:
means for determining a compression ratio;
means for determining an expected throughput based on the compression ratio; and
means for allocating the one or more physical addresses of the dedicated subset of the memory pages from the private page pool based on the expected throughput; and
means for writing the compressed data to the one or more physical addresses.

16. The apparatus of claim 15, further comprising:
means for determining that one or more allocated physical addresses allocated from the private page pool for the compressed data remain unused for writing the compressed data;
means for transferring the one or more allocated physical addresses to the private page pool; and
means for allocating one or more previously allocated physical addresses from the private page pool for a write operation.

17. The apparatus of claim 15, further comprising:
means for determining a usage rate of the dedicated subset of the memory pages in the private page pool;
means for determining whether a number of remaining pages in the private page pool is below a threshold based on the usage rate;
means for requesting additional memory pages from the main memory in response to determining whether the number of remaining pages in the private page pool is below the threshold; and
means for adding the additional memory pages to the private page pool.

18. The apparatus of claim 17, further comprising:
means for determining whether the number of remaining unallocated pages in the private page pool is above a second threshold based on the usage rate; and means for returning one or more pages from the private page pool to main memory in response to determining that the number of remaining unallocated pages in the private page pool is above the second threshold.

19. The apparatus of claim 15, further comprising:

means for receiving the compressed data from an application specific integrated circuit; and means for transferring the compressed data out of the dedicated subset of the memory pages of the private page pool to the main memory after writing the compressed data.

20. The apparatus of claim 15, wherein:

means for writing the compressed data to the one or more physical addresses includes means for mapping a virtual address to each of the one or more physical addresses; and the apparatus further comprises means for storing the mapping of virtual addresses and physical addresses that have been allocated in a private page table separate from a page table indexing the main memory.

* * * * *